United States Patent
Speziari et al.

(10) Patent No.: US 11,858,295 B2
(45) Date of Patent: Jan. 2, 2024

(54) CAR TYRE

(71) Applicant: PIRELLI TYRE S.p.A., Milan (IT)

(72) Inventors: Diego Speziari, Milan (IT); Roberto Bolzoni, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 638 days.

(21) Appl. No.: 16/472,455

(22) PCT Filed: Dec. 13, 2017

(86) PCT No.: PCT/IB2017/057887
§ 371 (c)(1),
(2) Date: Jun. 21, 2019

(87) PCT Pub. No.: WO2018/122657
PCT Pub. Date: Jul. 5, 2018

(65) Prior Publication Data
US 2021/0129591 A1    May 6, 2021

(30) Foreign Application Priority Data

Dec. 29, 2016 (IT) .................. 102016000132010

(51) Int. Cl.
*B60C 11/11* (2006.01)
*B60C 11/12* (2006.01)
(Continued)

(52) U.S. Cl.
CPC ........... *B60C 11/1236* (2013.01); *B60C 11/11* (2013.01); *B60C 11/12* (2013.01);
(Continued)

(58) Field of Classification Search
CPC ... B60C 11/11; B60C 11/12; B60C 2011/133; B60C 2200/14
See application file for complete search history.

(56) References Cited

U.S. PATENT DOCUMENTS

D744,413 S * 12/2015 Chen ........................ D12/579

FOREIGN PATENT DOCUMENTS

| CN | 1456452 A | 11/2003 |
| CN | 101070045 | 11/2007 |

(Continued)

OTHER PUBLICATIONS

Machine translation of DE-8809991-U1 (no date).*
(Continued)

*Primary Examiner* — Justin R Fischer
*Assistant Examiner* — Philip N Schwartz
(74) *Attorney, Agent, or Firm* — Finnegan, Henderson, Farabow, Garrett & Dunner, L.L.P.

(57) ABSTRACT

Tyre (100) for all-terrain vehicles having a tread band (2) comprising: —a central annular portion (A1), located across the equatorial plane (X-X), and two shoulder annular portions (A2, A3), separated from said central annular portion (A1) by two circumferential grooves (3, 4); said central annular portion (A1) having at least one circumferential row (8) of central blocks, comprising a plurality of central blocks (20), and at least two rows (9, 10) of lateral blocks, opposed to each other relative to said at least one circumferential row (8) of central blocks, and comprising a plurality of lateral blocks (21), wherein —said central blocks (20) have a first and a second portion (20a; 20b) located opposite to each other relative to the equatorial plane (X-X); —said central blocks (20) and said lateral blocks (21) have a circumferential dimension greater than 2% of the development extension of the tread of the tyre; —said lateral blocks (21) have an elongate portion (13) and a head portion (14) located at an end of said elongate portion (13); said elongate portion (13) having a dimension SI in axial direction and said head portion (14) having a dimension S2 in axial direction, where S2>S1; —the elongate portion (13) extends according to an
(Continued)

extension direction forming an angle α relative to the equatorial plane comprised between 0° and 30°; —said elongate portion (13) has an axially outer lateral wall (15) facing one of said circumferential grooves (3, 4) and an axially inner lateral wall (16) facing one of said first and second portions (20a, 20b) of the central blocks (20); —said head portion (14) has a first transverse wall (17) located so as to form with said axially inner lateral wall (16) a concavity which points towards the equatorial plane (X-X) and is such that the first or the second portion (20a; 20b) of the central block (20) being subsequent in axial direction faces said concavity and is at least partially surrounded by said axially inner lateral wall (16) and by said first transverse wall (17).

21 Claims, 4 Drawing Sheets (51) Int. Cl.
B60C 11/03 (2006.01)
B60C 11/13 (2006.01)
(52) U.S. Cl.
CPC ... B60C 11/1204 (2013.01); *B60C 2011/0346* (2013.01); *B60C 2011/1213* (2013.01); *B60C 2011/1254* (2013.01); *B60C 2011/133* (2013.01); *B60C 2200/14* (2013.01)

(56) References Cited

FOREIGN PATENT DOCUMENTS

| | | | | |
|---|---|---|---|---|
| CN | 101177107 | A | 5/2008 | |
| CN | 101623986 | | 1/2010 | |
| CN | 102398484 | A | 4/2012 | |
| CN | 202242811 | | 5/2012 | |
| CN | 103029524 | | 4/2013 | |
| CN | 203974424 | | 12/2014 | |
| CN | 203995492 | | 12/2014 | |
| CN | 104553627 | A | 4/2015 | |
| DE | 8524475 | U1 | 10/1986 | |
| DE | 8809991 | U1 * | 10/1988 | ............. B60C 11/12 |
| DE | 8809991 | U1 | 10/1988 | |
| EP | 0075760 | A2 | 4/1983 | |
| EP | 1107872 | | 6/2001 | |
| EP | 2933120 | A1 | 10/2015 | |
| EP | 3000622 | A1 | 3/2016 | |
| JP | H7-144511 | A | 6/1995 | |
| JP | H11-342708 | A | 12/1999 | |
| JP | 2004-058839 | A | 2/2004 | |
| JP | 2012-51513 | A | 3/2012 | |
| KR | 20020093583 | A * | 12/2002 | ......... B60C 11/0302 |
| LU | 79499 | A1 | 6/1979 | |
| WO | WO 9952720 | A1 | 10/1999 | |
| WO | WO 0026040 | A1 | 5/2000 | |

OTHER PUBLICATIONS

International Search Report form the European Patent Office in corresponding International Application No. PCT/IB2017/057887 dated Mar. 29, 2018.

Written Opinion of the International Searching Authority from the European Patent Office in corresponding International Application No. PCT/IB2017/057887 dated Mar. 29, 2018.

Notification of First Office Action dated Dec. 3, 2020 from China National Intellectual Property Administration, in counterpart Chinese Application No. 201780084753.7.

* cited by examiner

Fig. 4 ial grooves; said central annular portion having at least

CAR TYRE

This application is a national phase application under 35 U.S.C. § 371 based on International Application No. PCT/IB2017/057887, filed Dec. 13, 2017, and claims priority of Italian Patent Application No. 102016000132010, filed Dec. 29, 2016; the contents of each application is incorporated herein by reference.

FIELD OF THE INVENTION

The present invention refers to a motor vehicle tyre. In particular, the invention refers to a tyre for motor vehicles having large engine capacity, e.g. 3000-5000 cm$^3$ or higher, whose tread provides excellent performance both on-road and off-road.

Generally, tyres for off-road vehicles are designed (tread band, structure and profile) to be especially used on extreme, or in any case not asphalted, terrains, for example on rough grounds, dirt roads or mud- and/or sand-covered grounds.

In recent years, the so-called "all terrain" vehicles (four-wheel drive, shortly 4×4), i.e. vehicles which combine performance on both off-road and on-road terrains, have become increasingly popular and their versatility is highly appreciated by the market.

Among "all terrains" vehicles are included vehicles such as PICK-UPs, as well as SUVs (Sport Utility Vehicles), which combine spaciousness features typical of station wagons and high performance (especially in terms of high torque and speed) typical of sporty vehicles when driving on roads.

The drivers of this kind of vehicles, in fact, increasingly demand tyres which are able to provide excellent performance both when driving off-road and on-road, and at the same time also to ensure good handling features, low noise level and mileage.

However, the abovementioned features are conflicting with one another.

CN20381939, EP1107872 and EP3000622 disclose tyres for so-called "all terrain" vehicles.

SUMMARY OF THE INVENTION

The Applicant has observed that tyre manufacturers usually choose to make tyres for "all terrain" vehicles with a high void-to-rubber ratio, obtained by means of large blocks with an irregular contour, markedly spaced apart from one another so as to promote draining of mud when leaving the footprint area, strength on dirt roads and stability and traction on extreme, or in any case not asphalted, terrains.

The Applicant has however noticed that a marked mutual distance of the blocks, particularly in the most central portion of the tread band, results in an excessive mobility of the blocks, to the detriment of the tread band compactness and of the tyre noise level, particularly when driving on-road.

A low tread band compactness usually causes a decay of the tyre performance when running on-road and reduces the support surfaces particularly adapted to provide grip on yielding terrains, such as sand and/or snow.

Furthermore, an excessive mobility of the blocks may result in triggering of tears, breaking of blocks or portions thereof, as well as may cause uneven wear phenomena.

The Applicant has thus felt the need to provide a tyre for wheels of so-called "all terrain" vehicles, which is robust so as to withstand mechanical stresses and tears when contacting rough dirt and/or rocky grounds, has good traction features on any kind of road surface, is able to effectively drain water and mud so as to optimize traction and steerability, and nevertheless has low noise level and good handling features when driving on-road.

The Applicant has found that such needs may be met by providing, in the tread pattern of the tyre, circumferential grooves, preferably having a relevant size, for promoting draining and mud removal, and by creating a tread band central portion having large, robust blocks, arranged so as to determine an intermeshing of the blocks with one another which increases moving towards the equatorial plane, for improving the compactness of the tread band central portion.

In a first aspect thereof, the invention refers to a tyre having a tread band comprising:

a central annular portion, located across the equatorial plane, and two shoulder annular portions, separated from said central annular portion by two circumferential grooves; said central annular portion having at least one circumferential row of central blocks, comprising a plurality of central blocks, and at least two rows of lateral blocks, opposed to each other relative to said at least one circumferential row of central blocks and comprising a plurality of lateral blocks;

said central blocks having a first and a second portion located opposite to each other relative to the equatorial plane;

said central blocks and said lateral blocks having a circumferential dimension greater than 2% of the development extension of the tread of the tyre;

said lateral blocks having an elongate portion and a head portion located at an end of said elongate portion; said elongate portion having a dimension S1 in axial direction and said head portion having a dimension S2 in axial direction, where S2>S1;

the elongate portion extending according to an extension direction forming an angle relative to the equatorial plane comprised between 0° and 30°;

said elongate portion having an axially outer lateral wall facing one of said circumferential grooves and an axially inner lateral wall facing one of said first and second portions of the central blocks;

said head portion having a first transverse wall located so as to form with said axially inner lateral wall a concavity which points towards the equatorial plane and is such that the first or the second portion of the central block being subsequent in axial direction faces said concavity and is at least partially surrounded by said axially inner lateral wall and by said first transverse wall.

The Applicant made a tyre provided with circumferential grooves, preferably having a relevant size, adapted to promote draining and mud removal, and with a tread band central portion having large, robust blocks, arranged so as to determine an intermeshing of the blocks with one another, which increases moving towards the equatorial plane.

Generally speaking, the Applicant believes that providing a tread band central portion having blocks arranged so that they intermesh with one another increasingly moving towards the equatorial plane reduces the mobility of the blocks themselves and increases the compactness of the tread band central portion, thus improving the performance and reducing the noise level when driving on-road.

Furthermore, the Applicant believes that the increase in compactness in the tread band central portion, together with the large plan section of the blocks, contributes to increasing the tyre support surfaces in the footprint area, thus improving grip on yielding terrains, such as sand and/or snow.

The following definitions apply in the present description and the subsequent claims.

By "equatorial plane" of the tyre it is meant a plane perpendicular to the rotation axis of the tyre and dividing the tyre into two equal portions.

The terms "radial" and "axial" are used with reference, respectively, to a direction perpendicular to and a direction parallel to the rotation axis of the tyre, whereas the terms "circumferential" and "circumferentially" are used with reference to the direction of annular development of the tyre, i.e. the tyre rolling direction.

Thus:
by "radial direction" it is meant a direction developing generally away from the rotation axis of the tyre;
by "axial direction" it is meant a direction parallel to the rotation axis of the tyre, or inclined relative to such axis by an angle smaller than or equal to 45°;
by "circumferential direction" it is meant a direction parallel to the rolling direction of the tyre, or inclined relative to the rolling direction by an angle smaller than 45°.

By "void-to-rubber ratio" it is meant the ratio between the total surface area of the recesses in a given portion of the tread pattern of the tyre (possibly of the whole tread pattern) and the total surface area of the same given portion of the tread pattern (possibly of the whole tread pattern).

The present invention, in one or more preferred aspects thereof, may comprise one or more of the features hereinafter presented.

Preferably, the head portion may extend in axial direction so as to be axially and/or circumferentially opposed to one of said first and second portions.

Advantageously, the central blocks are circumferentially separated by first transverse grooves. Advantageously, the lateral blocks are circumferentially separated by second transverse grooves.

Conveniently, the first and second portions may have a second transverse wall facing the first transverse groove and at least partially opposed to the first transverse wall.

Preferably, the first transverse wall may be located opposite to the second transverse wall over at least ¼ of the axial dimension of the second transverse wall.

Advantageously, the second transverse wall of a first or second portion of a central block may be located at least partially opposite to the second transverse wall of the central block being subsequent in the circumferential direction.

Preferably, the lateral blocks of two different circumferential rows of lateral blocks may have head portions arranged so as to be oppositely oriented in circumferential direction.

Conveniently, each shoulder annular portion has a row of shoulder blocks comprising a plurality of shoulder blocks, wherein the blocks of said plurality are circumferentially separated with each other by third transverse grooves.

Preferably, in said tread band the number of shoulder blocks is greater than the number of lateral blocks.

Preferably, the number of shoulder blocks may be twice the number of lateral blocks.

Conveniently, in the tread band the number of lateral blocks in each row of lateral blocks is substantially the same as the number of central blocks.

For increasing the draining effect and the ability to remove mud when leaving the footprint area, the shoulder transverse grooves may be aligned with the second transverse grooves so as to form a substantially continuous channel between said annular shoulder portions and said central annular portion.

Preferably, for increasing the intermeshing ability of the blocks in the most central portion of the tread band, the first transverse grooves may be circumferentially staggered relative to the second transverse grooves.

Conveniently, the circumferential extension of each lateral block is substantially equal to the circumferential extension of two shoulder blocks.

Preferably, the elongate portion of each lateral block is substantially aligned with two shoulder blocks in circumferential direction.

Advantageously, the first and the second portion of a same central block are circumferentially staggered.

Conveniently, the elongate portion of each lateral block has an extension in circumferential direction greater than the extension in circumferential direction of the head portion.

Advantageously, the circumferential grooves may have a width greater than 7 mm.

Preferably, the circumferential grooves may have a depth greater than 10 mm.

Conveniently, for increasing the traction ability the circumferential grooves may have a zig-zagging course.

Advantageously, the shoulder transverse grooves may have a decreasing width moving towards the equatorial plane.

Preferably, the central portion may have a void-to-rubber ratio smaller than 0.4.

Preferably, the central portion may have a void-to-rubber ratio greater than 0.3.

Conveniently, the shoulder blocks may have a circumferential dimension smaller than 55 mm.

Advantageously, the central, lateral and preferably the lateral blocks have a plurality of sipes.

BRIEF DESCRIPTION OF THE DRAWINGS

Further features and advantages of the invention shall become clearer from the detailed description of some preferred, although not exclusive, embodiments of a tyre for motor vehicle wheels, particularly wheels of "all terrain" motor vehicles, according to the present invention.

Such description shall be made hereafter with reference to the accompanying drawings, provided only for indicating, and thus non-limiting, purposes, wherein.

DETAILED DESCRIPTION OF EMBODIMENTS

Referring to the attached figures, a tyre for motor vehicle wheels, in particular wheels of "all terrain" motor vehicles, according to the present invention is generally indicated at 1.

The structure of the tyre 1 is by itself of a conventional type and comprises a carcass, a tread band located at a crown portion of the carcass, a pair of axially opposite sidewalls, ending in beads reinforced with bead cores and associated bead fillings. Preferably, the tyre also comprises a belt structure interposed between carcass and tread band. The carcass comprises one or more carcass plies anchored to the bead cores, whereas the belt structure comprises two radially superimposed belt strips. The belt strips are formed by rubberized fabric segments incorporating metal chords, which are arranged parallel to one another in each strip and crossed relative to the chords of adjacent strips, preferably with a symmetrical inclination relative to the equatorial plane. Preferably, the belt structure also comprises, in a radially outer position, a third belt strip provided with chords oriented substantially parallel to the equatorial plane.

The tyre 1 preferably has a H/C ratio between the cross section height and the section maximum width comprised between 0.50 and 0.90.

For ensuring a high mileage and providing at the same time high performance, particularly as far as on-road handling is concerned, along the entire tyre life, the tread 2 has overall a void-to-rubber ratio which is low in combination with a tyre also intended for off-road use, namely a void-to-rubber ratio smaller than 0.5, preferably smaller than 0.47, for example equal to about 0.4.

Preferably, the overall void-to-rubber ratio of the tread 2 is greater than 0.30.

Referring to the exemplary embodiment shown in the figures, the tread band 2 comprises a central annular portion A1 and two shoulder annular portions A2, A3. The central annular portion A1, located across the equatorial plane X-X, is separated from the shoulder annular portions A2, A3 by two circumferential grooves 3, 4.

The circumferential grooves 3, 4 are mainly provided for ensuring draining of water in the footprint area, particularly when the tyre is running on a straight path. To this end, the circumferential grooves 3, 4 may have a width greater than or equal to about 7 mm. Preferably, the circumferential grooves 3, 4 may have a width smaller than or equal to about 20 mm, more preferably smaller than or equal to about 15 mm.

Preferably, the circumferential grooves 3, 4 may have a depth greater than or equal to about 10 mm, more preferably greater than or equal to about 15 mm, in any case smaller than or equal to about 30 mm. The choice of providing the circumferential grooves 3, 4 with a significant depth allows good draining features to be achieved.

Preferably, the circumferential grooves 3, 4 do not have circumferentially a straight course, but a zig-zagging one instead. In other words, the circumferential grooves 3, 4 preferably extend along the entire circumferential development of the tyre 1 with a course forming a broken line, comprising first circumferential segments, which are substantially inclined relative to the equatorial plane X-X, and second circumferential segments, which are inclined relative to the equatorial plane X-X, but counter-inclined relative to the first circumferential segments. The second circumferential segments circumferentially alternate with the first circumferential segments. The traction ability of the tread band 2 in the advancing direction of the tyre 1 is thus increased.

The central annular portion A1 has three circumferential rows 8, 9 and 10 of blocks 20, 21, whereas each shoulder annular portion A2; A3 has one row, 11, 12 respectively, of shoulder blocks.

The central annular portion A1 is designed so as to keep a large amount of rubber to the ground at the most central portion, i.e. near to the equatorial plane X-X, of the tyre 1.

The central annular portion A1 has three rows 8, 9, 10 of blocks, more specifically a circumferential row 8 of central blocks 20 and two circumferential rows 9, 10 of lateral blocks 21, opposed to each other relative to the circumferential row 8 of central blocks 20.

In the embodiment shown in the figures, the circumferential row 8 of central blocks 20 is located substantially across the equatorial plane X-X, as better described below.

The circumferential row 8 has a plurality of central blocks 20, wherein each block is circumferentially separated form a subsequent central block 20 by a first transverse groove 23 arranged according to a substantially axial direction.

Each circumferential row 9, 10 has a plurality of lateral blocks 21, wherein each lateral block 21 is separated from the circumferentially subsequent lateral block 21 by a second transverse groove 24 arranged according to a substantially axial direction.

The circumferential rows 9, 10 are located axially outwardly relative to the circumferential row 8, so that the circumferential row 9 is located between the circumferential groove 3 and the circumferential row 8, and the circumferential row 10 is located between the circumferential row 8 and the circumferential groove 4.

Preferably all of the central blocks 20 and the lateral blocks 21 of the central annular portion A1 are spaced apart from one another. In other words, the central blocks 10 and the lateral block 21 do not have mutual contact points.

The central blocks 20 and the lateral blocks 21 of the central annular portion A1 are mutually spaced apart and arranged so as to define in the central annular portion A1 a tread pattern characterized by a void-to-rubber ratio preferably greater than 0.3, more preferably equal to or smaller than 0.4.

Preferably, the central blocks 20 and the lateral blocks 21 have a substantially elongate shape in the circumferential direction.

Preferably, the central blocks 20 and the lateral blocks 21 have a dimension in circumferential direction which is greater than 2% of the development extension of the tread of the tyre.

In the embodiment shown in the figures each central block 20 extends across the equatorial plane X-X, so as to have a first and a second portion 20a; 20b located opposite to each other relative to the equatorial plane X-X itself.

Preferably, the first and the second portion 20a; 20b of each central block 20 are circumferentially staggered. In the embodiment shown in the figures the circumferential block 20 is substantially S-shaped.

Each first and second portion 20a; 20b of a central block 20 has a second transverse wall 18 facing a respective first transverse groove 23 so as to be at least partially opposed to the second transverse wall 18 of the central block 20 being subsequent in circumferential direction.

Preferably, two second transverse walls 18 of two circumferentially subsequent central blocks 20 facing the same first transverse groove 23 also oppose at least partially each other.

Figure 1:
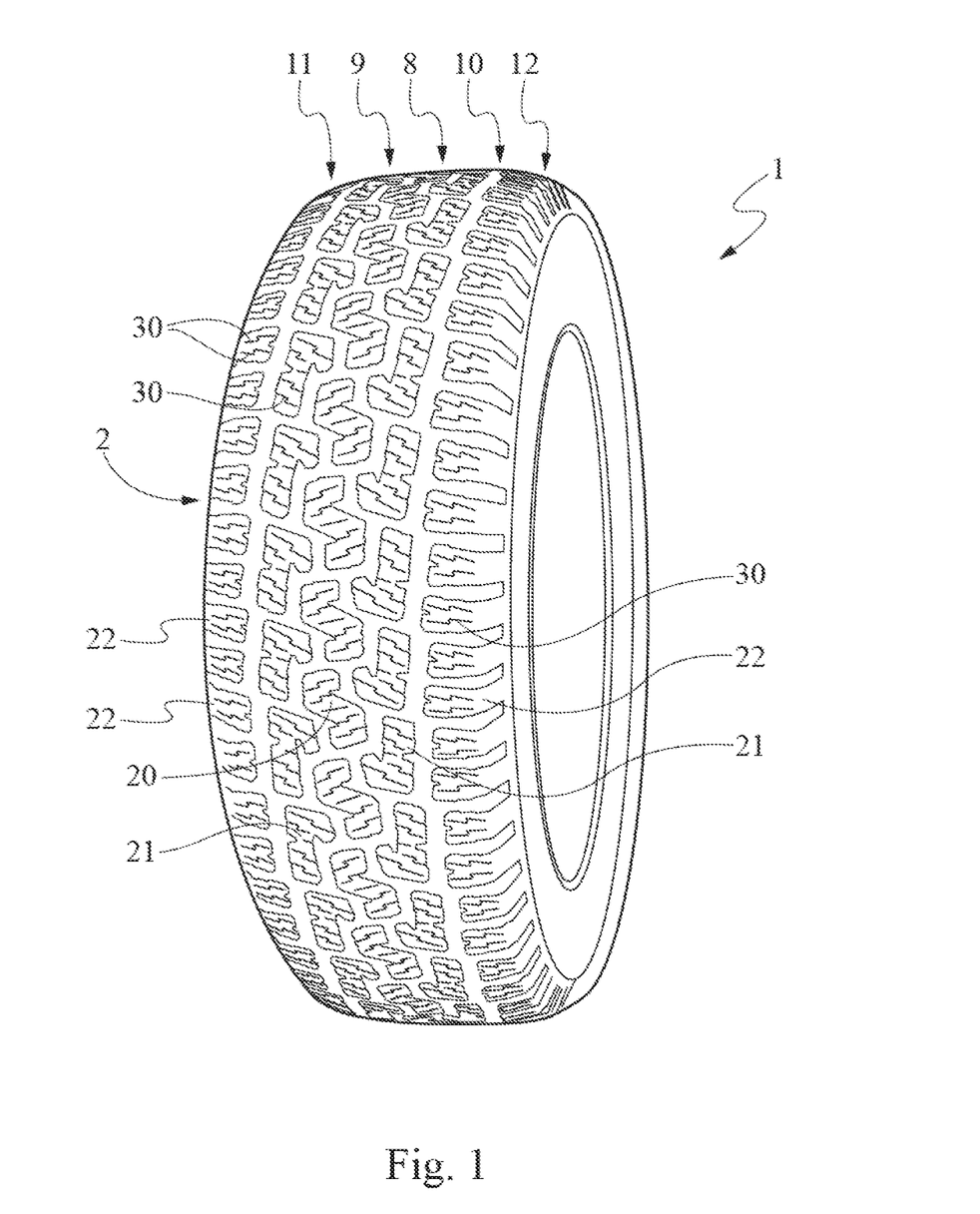
FIG. 1 shows a perspective view of an example of a tyre according to the invention.
Figure 2:
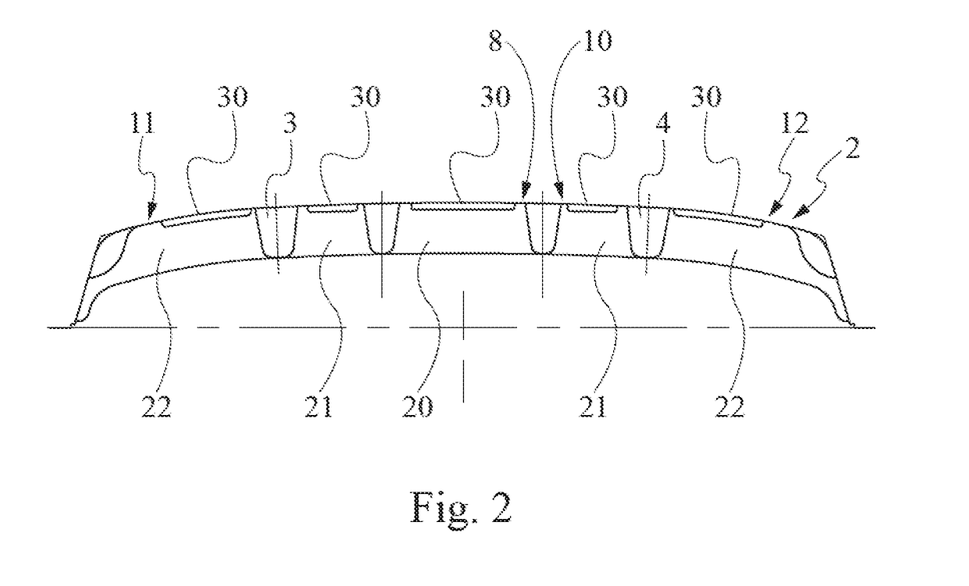
FIG. 2 is a radial section view of the tyre of FIG. 1.
Figure 3:
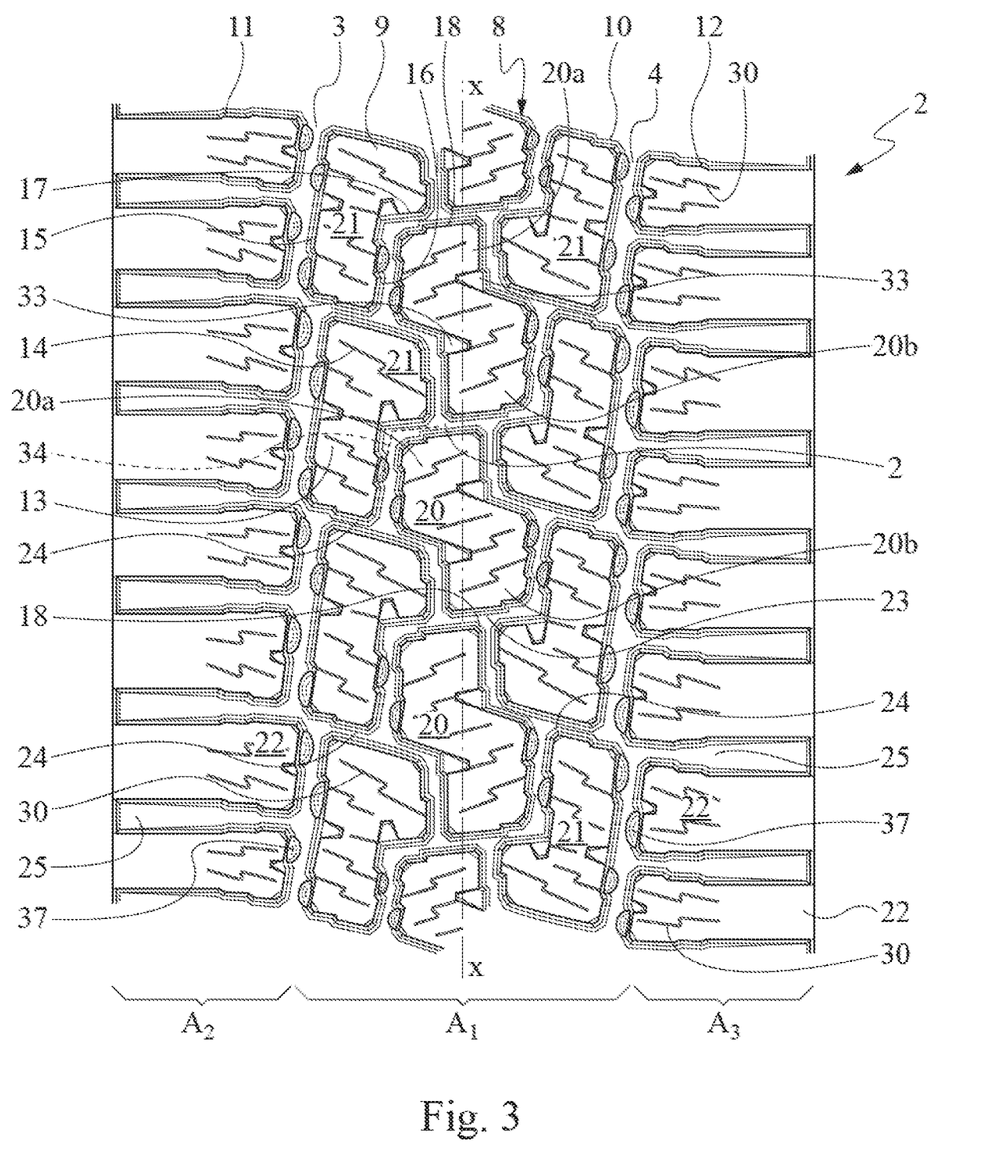
FIG. 3 is a schematic plan view of a tread band portion of the tyre of FIG. 1.
Figure 4:
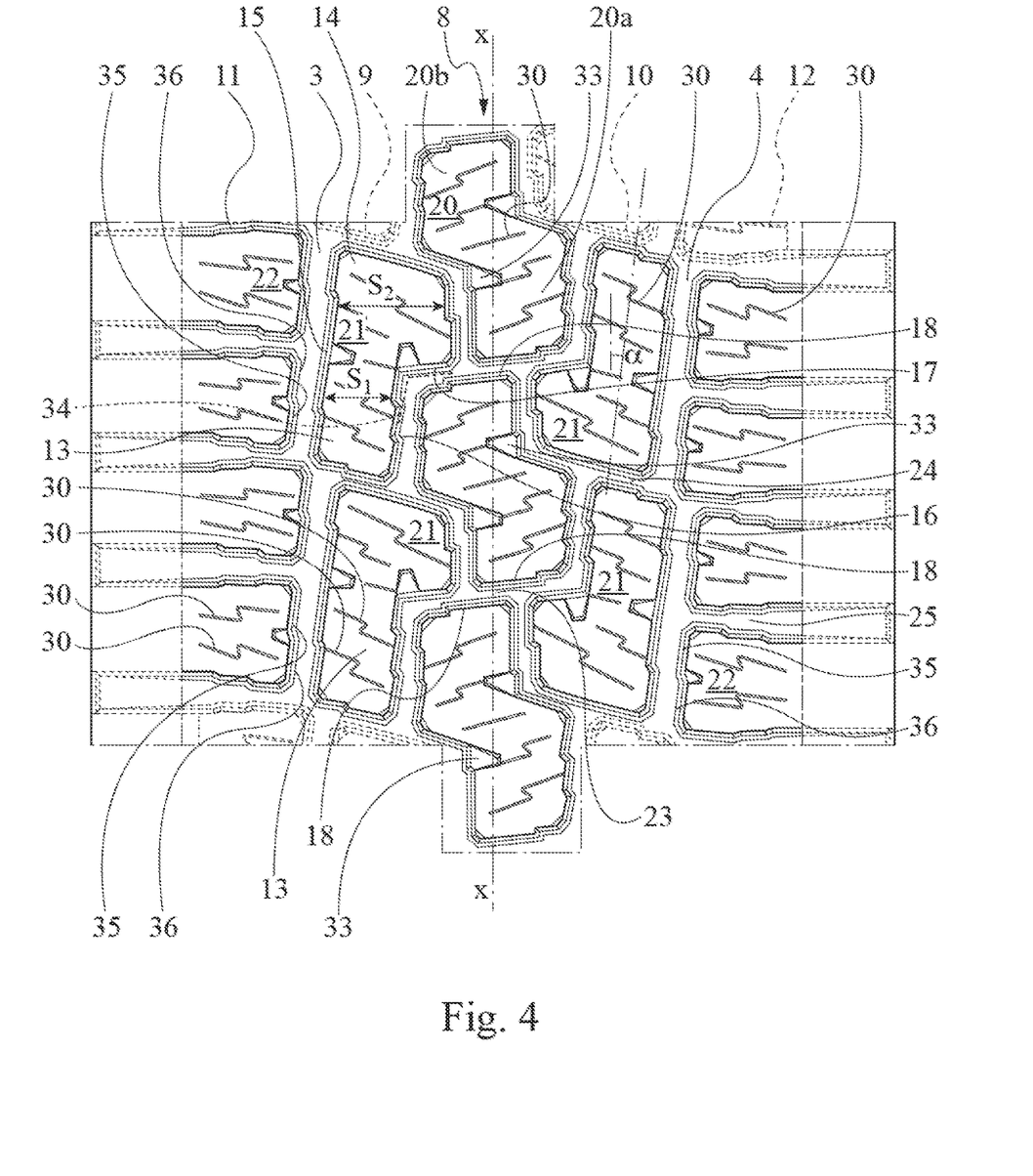
FIG. 4 is a schematic plan view of an enlarged tread band portion of a tyre according to the invention.

In the embodiment shown in FIGS. 1, 3 and 4, two second transverse walls 18 of two circumferentially subsequent central blocks 20 facing the same transverse groove 23 oppose each other over at most 50%, preferably at most 40%, of the axial dimension of each second transverse wall.

The partially opposed arrangement of the second transverse walls 18 of two central blocks 20 allows the mobility of the same blocks in circumferential direction to be reduced, thus contributing to increasing the compactness of the central portion A1 of the tread band 2. For not excessively increasing the stiffness of the central blocks 20, they may have at least one lightening notch 33. In the embodiment shown in FIGS. 1, 3 and 4 two lightening notches 33 for each central block 20 are provided. Preferably, the lightening notch 33 extends between a lateral wall of the central block 20 and the equatorial plane X-X.

In the embodiment shown in FIGS. 1, 3 and 4 the lightening hole 33 has a plan section of substantially triangular shape, wherein a base of the triangle is located at a lateral wall of the central block 20.

The lightening notch 33 extends radially from a top surface of the central block 20.

Preferably, the lightening notch 33 does not extend over the whole height of the central block 20, but has a radial dimension which smaller than the height of the block itself.

Preferably, the lateral blocks 21 of the circumferential rows 9 and 10, leaving out their orientation, have substantially the same shape, therefore the description of the lateral blocks 21 of the circumferential row 9 holds true also for the lateral blocks 21 of the circumferential row 10.

Referring to the embodiment shown in the figures, each lateral block 21 has an elongate portion 13 and a head portion 14 located at an end of the elongate portion 13.

The elongate portion 13 has an extension in circumferential direction greater than the extension in circumferential direction of the head portion 14.

Preferably, the elongate portion 13 has an extension in circumferential direction equal to about 1.5-3 times the extension in circumferential direction of the head portion 14. The elongate portion 13 a dimension S1 in axial direction and the head portion 14 has a dimension S2 in axial direction, where S2>S1.

The mutual arrangement and the axial dimension of the elongate portion 13 and the head portion 14 are such that each lateral block 21 is substantially L- or P-shaped.

The elongate portion 13 extends substantially in circumferential direction.

Preferably, the elongate portion 13 extends according to an extension direction forming an angle α relative to the equatorial plane X-X comprised between 0° and 30°, even more preferably between 5° and 20°.

Referring to the embodiment shown in FIGS. 1, 3 and 4, the lateral blocks 21 of the circumferential row 9 of lateral blocks have head portions 14 arranged in the circumferential so as to be oppositely oriented relative to the head portions 14 of the lateral blocks 21 of the circumferential row 10.

Preferably, the head portion 14 of each lateral block 21 extends in axial direction so as to be axially opposed to one of the first and the second portion 20a; 20b of the central block 20 being subsequent in axial direction.

Preferably, the head portion 14 of each lateral block 21 extends in axial direction so as to be circumferentially opposed to one of the first and the second portion 20a; 20b of the central block 20 being subsequent in circumferential direction.

Each central block 20 is thus enclosed in circumferential direction between two head portions 14 of two lateral blocks 21 located opposite to each other relative to the equatorial plane X-X. In this way the mobility of the blocks 20 in circumferential direction is further constrained and the compactness of the central portion A1 of the tread band 2 is thus increased.

In the embodiment shown in the figures the elongate portion 13 has an axially outer lateral wall 15 facing one of the circumferential grooves 3, 4, and an axially inner lateral wall 16 opposed to one of said first and second portions 20a, 20b of an axially subsequent central block 20.

The head portion 14 has a first transverse wall 17 located so as to form with the axially inner lateral wall 16 a concavity 34 which points towards the equatorial plane X-X.

The concavity 34 faces the first or the second portion 20a; 20b of the central block 20 being subsequent in axial direction, surrounding the same at least partially.

In this way the first and the second portion 20a, 20b of the central block 20 are always constrained in their movements, both when entering and when leaving the footprint area, also in axial direction, with a further advantage to the compactness of the central portion A1 of the tread band 2.

The first transverse wall 17 of the head portion 14 faces the first transverse groove 23 and is located opposite to the second transverse wall 18.

In the embodiment shown in the FIGS. 1, 3 and 4 the first transverse wall 17 of the head portion is located opposite to the second transverse wall 18 of a central block 20 over at least ¼ of the axial dimension of the second transverse wall 18 itself.

In this way each second transverse wall 18 of each central block 20 is located opposite to a first transverse wall 17 of the head portion 14 of a lateral block 21 being subsequent in axial direction and, at the same time, to a second transverse wall 18 of the central block 20 being subsequent in circumferential direction.

As mentioned above, the circumferential grooves 3, 4 separate the central annular portion A1 respectively from the shoulder portions A2, A3.

In detail, the shoulder annular portion A2 has a row 11 of shoulder blocks 22 separated from each other by shoulder transverse grooves 25.

Preferably, the shoulder transverse grooves 25, at least in a first segment thereof, may be substantially arranged according radial planes of the tyre 1.

Preferably, the shoulder transverse grooves 25 do not have a constant width, but a width which decreases moving axially away from tyre edge. Even more preferably, they have stepwise decreasing width.

In particular, referring to the embodiment shown in the figures, each shoulder transverse groove 25 comprises segments having different widths: a first segment, closer to the equatorial plane X-X, may have a width comprised between 3 mm and 15 mm, and a second segment, more spaced apart from the equatorial plane X-X, may have a width comprised between 8 mm and 20 mm. The shoulder transverse grooves 25 further comprise a third segment, located between said first and second segments, having a width whose value lies in-between the width values characterizing said first and second segments.

Moreover, the shoulder transverse grooves 25 preferably have a depth greater than 8 mm, preferably comprised between 10 mm and 17 mm.

According to the embodiment shown in the figures, the shoulder blocks 22 have substantially a rectangular shape. In their axially outermost portion the shoulder blocks 22 are arranged substantially perpendicularly to the equatorial plane X-X.

The shoulder blocks 22 end substantially facing the central portion A1 with an axially inner end formed by two sides 35, 36 which extend according a substantially circumferential direction and are preferably axially staggered relative to each other.

Referring to the row 12 of lateral blocks 22 of the shoulder portion A3, it can be noted that such row is totally similar to the row 11 of blocks 22 of the shoulder region A2, therefore the description made with reference to the lateral blocks 22 of the row 11 holds true for the lateral blocks 22 of row 12 as well.

Preferably, in the tread band 2 the number of shoulder blocks 22 is greater than the number of lateral blocks 21. Preferably, the number of shoulder blocks 22 is twice the number of lateral blocks 21.

In the tread band 2 the number of lateral blocks 21 of each row 9, 10 is substantially the same as the number of central blocks 20.

The decreasing number of blocks moving towards the equatorial plane X-X, in conjunction with their mutual arrangement and with the presence of portions of the central blocks 20 having a shape suitable for insertion into cavities formed in the lateral blocks 21 when entering in the footprint area, results in a high compactness of the most central portion of the tread band, which is advantageous for improving the driving performance on dry ground, reducing the noise level, and increasing the grip on yielding terrains, such as sand and/or snow.

For increasing the draining and mud removal ability when leaving the footprint area, the shoulder transverse grooves 25 are aligned with the second transverse grooves 24 so as to form a substantially continuous channel between the annular shoulder portions A2, A3 and the central annular portion A1.

On the contrary, for not reducing the compactness of the central portion A1 with the formation of continuous transverse channels having an excessive extension, the second transverse grooves 24 are circumferentially staggered relative to the first transverse grooves 23.

Preferably, according to the present invention, the blocks 20, 21, 22 may be provided with sipes 30.

The sipes 30 may have a depth comprised between 2 and 15 mm, for example equal to 3 mm, and a width smaller than 2 mm.

Preferably, the sipes 30 of the shoulder blocks 22 are usually provided in the axially innermost portion of the blocks 22 and have a substantially Z-shaped course, with the two segments having a greater extension arranged substantially according to the extension direction of the block.

In other words, the sipes 30 have two substantially straight segments, arranged substantially orthogonally to the equatorial plane X-X, joined with each other by a segment having a smaller extension as compared to the extension of said two substantially straight segments and arranged substantially orthogonally thereto.

Each of the two substantially straight segments has an extension which is greater, preferably about 2-3 times greater, than the extension of the other segment, arranged substantially orthogonally to said two substantially straight segments.

The sipes 30 provided in the lateral blocks 21 of the circumferential grooves 9 also have a substantially Z-shaped course, but with a different orientation. In particular, the two segments with a greater extension are mutually arranged substantially according to parallel directions, whereas the segment with a smaller extension is counter-inclined relative to said two segments with a greater extension.

The sipes 30 provided in the central blocks 20 also have a substantially Z-shaped course, but preferably with a different orientation as compared to the sipes in the blocks of the circumferential rows 9 and 10.

In particular, in the embodiment shown in FIGS. 3 and 4, the sipes 30 of the row of central blocks 20 are counter-inclined relative the sipes 30 of the circumferential row 9 of lateral blocks 21.

According to an embodiment shown in FIG. 3, it can be noted that the grooves oriented in circumferential direction may have reinforcing elements 37, which extend radially and project form the walls of the blocks 20, 21, 22 facing said grooves.

The reinforcing elements 37 extend from the bottom of the grooves without reaching the top of the blocks 20, 21, 22 from which they laterally project.

Preferably, the reinforcing elements 37 have a radial dimension comprised between 3 mm and 10 mm, preferably equal to about 5 mm.

Preferably, the reinforcing elements 37 have a half-conical shape, with the base located at the groove bottom.

The reinforcing elements 37 further strengthen the base of the blocks 20, 21, 22 and additionally prevent the trapping of stones within the circumferential grooves, particularly on dirt paths and/or rocky grounds.

Tyres having size 245/70 R17, model Scorpion ATR, presently marketed by the Applicant (Comparison) were compared with tyres having the same size and a tread pattern made according to the embodiment of the invention shown in the figures (Invention).

Both tyres were fitted to a 7J17" rim inflated at a pressure of 2.4 bar.

A Toyota Hilux motor vehicle was equipped with four tyres made according to the invention and then with four comparison tyres.

Tests of the running behavior, both on-road, on dry and wet grounds, and off-road, particularly on muddy terrains and terrains with gravel and cobblestones, were performed. The on-road running behavior test, on dry, wet and snow-cowered grounds, is performed on predetermined paths, typically tracks closed to traffic. By simulating some characteristic maneuvers (such as change of lane, overtaking, slalom between traffic cones, entering and leaving a bend) at a constant speed, as well as during acceleration and deceleration, the test driver evaluates the performances of the tyre by giving a score to the behavior of the latter during the aforementioned maneuvers.

The off-road running behavior tests are also performed on predetermined paths, closed to traffic, which comprise different kinds of terrains (i.e. mud, cobblestones, etc.).

Also in this case the test driver, performing some maneuvers on the different terrains, evaluates, by giving a score, the traction, handling, controllability, and rear axle directionality of the tyre during the test.

Moreover, two different kinds of noise tests outside the vehicle were performed, one with instruments and the other subjective.

The test results are reported in Table I, where the evaluation scores are expressed in percentage, setting to 100 the values referred to the comparison tyre. The evaluation scale represents a subjective evaluation made by the test driver which tests one after the other the tyre sets under comparison.

TABLE I

|  | Comparison | Invention |
|---|---|---|
| Mud | 100 | 119 |
| Gravel and cobblestones | 100 | 104 |
| Aquaplaning on bends | 100 | 106 |
| Aquaplaning on a straight path | 100 | 104 |
| Behavior on dry ground | 100 | 100 |
| Behavior on wet ground | 100 | 116 |
| Braking on snow | 100 | 115 |
| Traction on snow | 100 | 120 |

In Table I values greater than 100 indicate and improvement relative to the comparison tyre.

The tyre of the invention has thus shown a substantial overall improvement relative to the comparison tyre.

The invention claimed is:

1. A tyre having a tread band comprising:
a central annular portion, located across an equatorial plane (X-X), and two shoulder annular portions, separated from the central annular portion by two circumferential grooves; the central annular portion having at least one circumferential row of central blocks, comprising a plurality of central blocks, and at least two rows of lateral blocks, opposed to each other relative to the at least one circumferential row of central blocks, and comprising a plurality of lateral blocks, wherein the central blocks have a first and a second portion located opposite to each other relative to the equatorial plane (X-X);
the central blocks and the lateral blocks have a circumferential dimension greater than 2% of a development extension of the tread band of the tyre;
the lateral blocks have an elongate portion and a head portion located at an end of the elongate portion; the elongate portion having a dimension (S1) in an axial direction and the head portion having a dimension (S2) in the axial direction, where S2>S1;
the elongate portion extends according to an extension direction forming an angle (α) a relative to the equatorial plane (X-X) comprised between 0° and 30°;
the elongate portion has an axially outer lateral wall facing one of the circumferential grooves and an axially inner lateral wall facing one of the first and second portions of the central blocks; and
the head portion has a first transverse wall forming with the axially inner lateral wall a concavity which points towards the equatorial plane (X-X) and wherein the first or the second portion of a central block subsequent in the axial direction faces the concavity and is at least partially surrounded by the axially inner lateral wall and by the first transverse wall;
the two shoulder annular portions each having a row of shoulder blocks comprising a plurality of shoulder blocks circumferentially separated by shoulder transverse grooves;
wherein in the tread band, a number of shoulder blocks is twice a number of lateral blocks.

2. The tyre according to claim 1, wherein the head portion extends in the axial direction to be axially and/or circumferentially opposed to one of the first and second portions.

3. The tyre according to claim 1, wherein the central blocks are circumferentially separated by first transverse grooves and the lateral blocks are circumferentially separated by second transverse grooves.

4. The tyre according to claim 1, wherein the first transverse grooves are circumferentially staggered relative to the second transverse grooves.

5. The tyre according to claim 1, wherein the first transverse wall is located opposite to the second transverse wall over at least ¼ of an axial dimension of the second transverse wall.

6. The tyre according to claim 5, wherein the second transverse wall of the first or second portions of the central blocks is located at least partially opposite to a second transverse wall of the central block subsequent in a circumferential direction.

7. The tyre according to claim 1, wherein the lateral blocks of two different circumferential rows of lateral blocks have the head portions arranged to be oppositely oriented in the circumferential direction.

8. The tyre according to claim 1, wherein in the tread band, a number of lateral blocks in each row of lateral blocks is substantially the same as a number of central blocks.

9. The tyre according to claim 1, wherein the central blocks are circumferentially separated by first transverse grooves and the lateral blocks are circumferentially separated by second transverse grooves, and the shoulder transverse grooves are aligned with the second transverse grooves forming a substantially continuous channel between the shoulder annular portions and the central annular portion.

10. The tyre according to claim 1, wherein the shoulder transverse grooves have a decreasing width moving towards the equatorial plane (X-X).

11. The tyre according to claim 1, wherein the shoulder blocks have a circumferential dimension smaller than 55 mm.

12. The tyre according to claim 1, wherein the first and second portions of a same central block are circumferentially staggered.

13. The tyre according to claim 1, wherein the elongate portion of the lateral blocks has an extension in a circumferential direction greater than an extension in the circumferential direction of the head portion.

14. The tyre according to claim 1, wherein the circumferential grooves have a width greater than 7 mm.

15. The tyre according to claim 1, wherein the circumferential grooves have a depth greater than 10 mm.

16. The tyre according to claim 1, wherein the circumferential grooves have a zig-zagging course.

17. The tyre according to claim 1, wherein the central annular portion has a void-to-rubber ratio smaller than 0.4.

18. The tyre according to claim 1, wherein at least the central and lateral blocks have a plurality of sipes.

19. The tyre according to claim 3, wherein the first and second portions of the central blocks have a second transverse wall oriented in a single direction facing the first transverse groove and at least partially opposed to the first transverse wall.

20. A tyre having a tread band comprising:
a central annular portion, located across an equatorial plane (X-X), and two shoulder annular portions, separated from the central annular portion by two circumferential grooves; the central annular portion having at least one circumferential row of central blocks, comprising a plurality of central blocks, and at least two rows of lateral blocks, opposed to each other relative to the at least one circumferential row of central blocks, and comprising a plurality of lateral blocks, wherein the central blocks have a first and a second portion located opposite to each other relative to the equatorial plane (X-X);
the central blocks and the lateral blocks have a circumferential dimension greater than 2% of a development extension of the tread band of the tyre;
the lateral blocks have an elongate portion and a head portion located at an end of the elongate portion; the elongate portion having a dimension (S1) in an axial direction and the head portion having a dimension (S2) in the axial direction, where S2>S1;
the elongate portion extends according to an extension direction forming an angle (α) a relative to the equatorial plane (X-X) comprised between 0° and 30°;
the elongate portion has an axially outer lateral wall facing one of the circumferential grooves and an axially inner lateral wall facing one of the first and second portions of the central blocks; and the head portion has a first transverse wall forming with the axially inner lateral wall a concavity which points towards the equatorial plane (X-X) and wherein the first or the second portion of a central block subsequent in the axial direction faces the concavity and is at least partially surrounded by the axially inner lateral wall and by the first transverse wall;

the two shoulder annular portions each having a row of shoulder blocks comprising a plurality of shoulder blocks circumferentially separated by shoulder transverse grooves;

wherein the circumferential dimension of each of the lateral blocks is substantially equal to a circumferential dimension of two shoulder blocks.

21. The tyre according to claim 20, wherein the central blocks are circumferentially separated by first transverse grooves and the first and second portions of the central blocks have a second transverse wall oriented in a single direction facing the first transverse groove and at least partially opposed to the first transverse wall.

* * * * *